(12) United States Patent
Ito

(10) Patent No.: US 6,774,775 B2
(45) Date of Patent: Aug. 10, 2004

(54) TRANSMITTER CASING FOR A TIRE CONDITION MONITORING APPARATUS

(75) Inventor: Yoshitaka Ito, Ogaki (JP)

(73) Assignee: Pacific Industrial Co., Ltd., Gifu-Ken (JP)

( * ) Notice: Subject to any disclaimer, the term of this patent is extended or adjusted under 35 U.S.C. 154(b) by 41 days.

(21) Appl. No.: 10/306,313

(22) Filed: Nov. 27, 2002

(65) Prior Publication Data

US 2003/0210137 A1 Nov. 13, 2003

(30) Foreign Application Priority Data

Nov. 28, 2001 (JP) ........................................ 2001-362157

(51) Int. Cl.$^7$ .............................................. B60C 23/00
(52) U.S. Cl. ....................... 340/442; 340/445; 340/447; 73/146; 73/146.4; 73/146.8
(58) Field of Search ................................ 340/442, 445, 340/447; 73/146, 146.4, 146.8

(56) References Cited

U.S. PATENT DOCUMENTS

| | | | |
|---|---|---|---|
| 5,798,689 A | 8/1998 | Huang | 340/447 |
| 5,844,131 A | 12/1998 | Gabelmann et al. | 73/146.8 |
| 6,101,870 A | 8/2000 | Kato et al. | 78/146.8 |

FOREIGN PATENT DOCUMENTS

| | | | |
|---|---|---|---|
| EP | 0 985 560 A2 | 3/2000 | B60C/23/04 |
| JP | 2000-81358 | 3/2000 | G01L/17/00 |

Primary Examiner—Julie Lieu
(74) Attorney, Agent, or Firm—Fish & Richardson P.C.

(57) ABSTRACT

A casing for a transmitter is attached to a wheel such that the transmitter is located inside a tire. The casing has an upper plate, a lower plate, a surrounding wall extending between the upper plate and the lower plate, and a pair of skirts. The surrounding wall includes a front surface and a pair of side surfaces. Each skirt is located at one of corners defined between the front surface and the side surfaces. Each skirt is curved such that the front surface and the corresponding side surface are smoothly connected. The skirts are inclined with respect to the lower plate at an angle in the range of 65 to 75 degrees. This sufficiently endures pressure applied by a tire when removing the tire from a wheel.

10 Claims, 9 Drawing Sheets

TRANSMITTER CASING FOR A TIRE CONDITION MONITORING APPARATUS

BACKGROUND OF THE INVENTION

The present invention relates to an apparatus that monitors the tire condition such as tire pressure. More specifically, the present invention pertains to a casing of a transmitter that is installed inside a tire for transmitting information concerning tire condition to a receiver in the vehicle.

Pursuant to 35 USC § 119, this application claims the benefit of Japan Patent Application No. 2001-362157 filed Nov. 28, 2001.

As shown in FIG. 10(a), a conventional transmitter 101 disclosed in Japanese Laid-Open Patent Publication No. 2000-81358 transmits tire pressure information to a receiver (not shown) in a vehicle. The transmitter 101 includes a rectangular box-shaped casing 102 and a valve stem 103, which is formed integrally on the casing 102. An air hole 104 is formed on the top surface of the casing 102. The casing 102 accommodates a pressure detector, a signal processing circuit, an electronic substrate, and a battery (not shown).

As shown in FIG. 11, the transmitter 101 is attached to a predetermined part of a wheel 112 such that the casing 102 is located inside a tire 9. Air is injected into the tire 9 from the valve stem 103 through the air hole 104.

If the electronic substrate, which is accommodated in the casing 102, is excessively close to the wheel 112, the electric wave characteristics deteriorate. Therefore, the electronic substrate is accommodated in the casing 102 to be furthest from the wheel 112.

As shown in FIGS. 10(a) and 10(b), a flange 105 extends outward from the bottom of the casing 102. Angular reinforcement ribs 106 are located between the flange 105 and the circumferential surface of the casing 102. Each reinforcement rib 106 has an inclination angle θ.

FIG. 7 is a perspective view of a typical tire detaching apparatus 111. The tire detaching apparatus 111 includes a turntable 115 having fixed hooks 114 and a roller 113, which is located above the turntable 115. To remove the tire 9 from the wheel 112, the roller 113 is inserted between a lower bead 9b of the tire 9 and the wheel 112, and is engaged with the lower bead 9b. Then, the lower bead 9b is lifted by the roller 113 while rotating the wheel 112.

FIGS. 8(a) to 8(d) show processes for removing the tire 9 from the wheel 112. FIG. 9 shows the relationship between the lower bead 9b and the transmitter 101 when removing the tire 9 from the wheel 112. On the assumption that a line S0, which is perpendicular to the axis of the wheel 112 and lies along the air hole 104, is zero degrees, the lower bead 9b starts to slide over the transmitter 101 at a portion that is approximately 45 to 60 degrees from the line S0 about the air hole 104 of the transmitter 101. The inclination angles θ of two reinforcement ribs 106 at the portion of the transmitter 101 where the lower bead 9b slides over are set within the range of 45 to 60 degrees.

When the inclination angle θ of each reinforcement rib 106 is within 45 to 60 degrees, the lower bead 9b smoothly slides over the transmitter 101. However, the inclination angle θ of each reinforcement rib 106 is relatively small. Thus, when the lower bead 9b contacts each reinforcement rib 106, a relatively large bending moment is applied to the casing 102 in a direction to force the casing 102 downward as viewed in FIG. 10(b).

However, depending on the shape of the wheel 112, a relatively large space is formed between the bottom of the transmitter 101 and the wheel 112. If the space is formed, the casing 102 may deform or be damaged by the bending moment that forces the casing 102 downward. Further, since the reinforcement ribs 106 and the flange 105 project from the casing 102, the lower bead 9b might slip in the space and be caught by the casing 102. Therefore, the transmitter 101 needs to be removed from the wheel 112 beforehand. To remove the transmitter 101, an operator needs to loosen a screw, which is not shown, and drop the transmitter 101 in the inner space of the tire 9. Thus, the operation for removing the tire 9 is troublesome.

SUMMARY OF THE INVENTION

The objective of the present invention is to provide a transmitter casing for a tire condition monitoring apparatus that sufficiently endures pressure applied by a tire when removing the tire from a wheel, and permits a tire to be easily removed from the wheel.

To achieve the above objective, the present invention provides a casing for a transmitter. The transmitter is attached to a wheel such that the transmitter is located inside a tire. The transmitter transmits information concerning the tire condition. The casing includes an upper plate, a lower plate, a surrounding wall, and a pair of skirts. The lower plate faces the upper plate. The surrounding wall extends between the upper plate and the lower plate, and includes a front surface and a pair of side surfaces, which intersect the front surface. Each skirt is located at one of corners defined between the front surface and the side surfaces. Each skirt is curved such that the front surface and the corresponding side surface are smoothly connected. The skirts are inclined with respect to the lower plate at an angle in the range of 65 to 75 degrees.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A transmitter for a tire condition monitoring apparatus 1 according to a first embodiment of the present invention will now be described with reference to FIGS. 1(a), 1(b), and 2.

Figure 1:
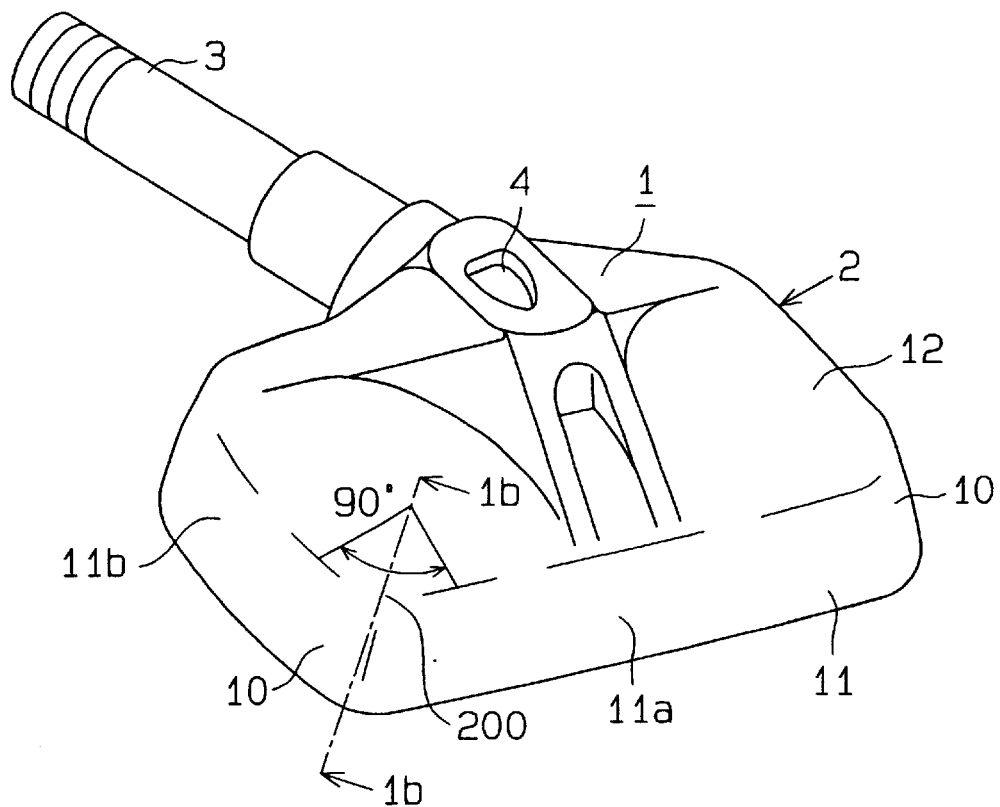
FIG. 1(a) is a perspective view illustrating a transmitter for a tire condition monitoring apparatus according to a first embodiment of the present invention.
FIG. 1(b) is a partial cross-sectional view taken along line 1b—1b in FIG. 1(a)
Figure 1:
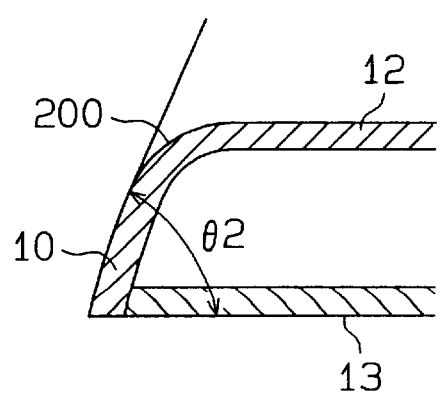

FIG. 1 is a perspective view illustrating a casing 2 of the transmitter 1. The transmitter 1 of the first embodiment has substantially the same structure as the conventional transmitter 101 of FIG. 10(a). That is, the transmitter 1 includes the rectangular box-shaped casing 2 and a valve stem 3, which is integrally formed on the casing 2. An air hole 4 is formed in the upper surface of the casing 2. The casing 2 accommodates a pressure detector, a signal processing circuit, an electronic substrate, and a battery (not shown). Like the conventional transmitter 101 of FIG. 10(a), the transmitter 1 is attached to a predetermined part of a wheel 112 such that the casing 2 is located inside a tire 9. Air is injected into the tire 9 from the valve stem 3 through the air hole 4. The side on which the valve stem 3 is located is referred to as the rear side of the casing 2.

As shown in FIGS. 1(a) and 1(b), the casing 2 includes an upper plate 12, a lower plate 13, and a surrounding wall 11. The upper plate 12 is parallel to the lower plate 13, and the surrounding wall 11 connects the periphery of the upper plate 12 to the periphery of the lower plate 13. The surrounding wall 11 includes a front surface 11a and side surfaces 11b. A skirt 10 is formed on each of the front corners of the casing 2. Each skirt 10 curves from the front surface 11a toward the corresponding side surface 11b. Each skirt 10 forms a part of the surrounding wall 11. As shown in FIG. 1(b), a portion of each skirt 10 that connects the upper plate 12 to the surrounding wall 11 is curved. As viewed from above the skirts 10, the lower end of each skirt 10 forms a part of a spherical surface, the radius of which is substantially 10 mm. A portion where the upper plate 12, the front surface 11a, and each side surface 11b intersect, or a crown 200 of each skirt 10, forms a part of a substantially spherical surface. For example, the radius of each spherical surface may be 7 to 8 mm. Each skirt 10 is inclined with respect to the lower plate 13 at an inclination angle θ2. The inclination angle θ2 is within the range of 65 to 75 degrees.

Figure 2:
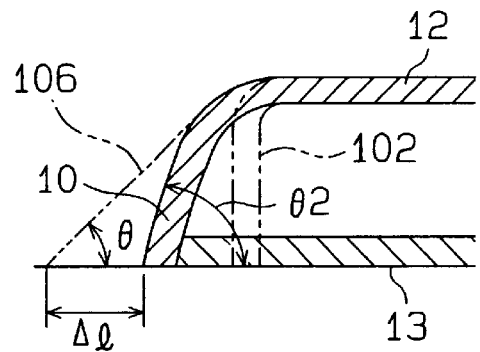
FIG. 2 is a view illustrating the relationship between a skirt of the transmitter and a prior art reinforcement rib shown in FIG. 10(a)

As shown in FIG. 2, the inclination angle θ2 of each skirt 10 is greater than the inclination angle θ of each conventional reinforcement rib 106. Therefore, in a case in which the lower bead 9b contacts one of the skirts 10 when removing the tire 9, force that presses the skirt 10 downward is relatively small. Thus, although a space is formed between the casing 2 and the wheel 112, the casing 2 endures the downward pressure. Also, since the inclination angle θ2 of each skirt 10 is relatively large, the lower bead 9b is prevented from being caught by the lower end of the skirt 10 although the space is formed.

Since each skirt 10 forms a curved surface, or more specifically, the crown 200 of each skirt 10 is part of a spherical surface, the same force is applied to the skirt 10 from any direction when the lower bead 9b contacts the skirts 10. As a result, force applied to the electronic substrate and the battery, which are embedded in the casing 2, is minimized.

Since the crown 200 of each skirt 10 forms a part of a spherical surface, the lower bead 9b smoothly slides over the transmitter 1.

Figure 10A:
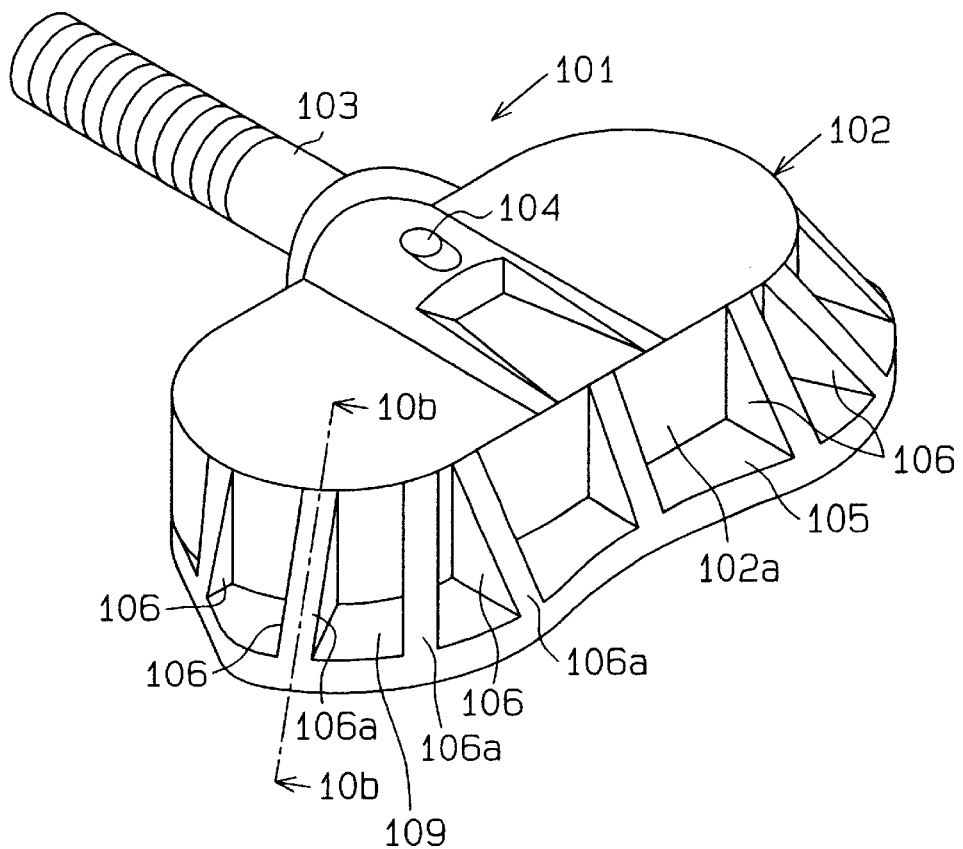
FIG. 10(a) is a perspective view illustrating a conventional transmitter for a tire condition monitoring apparatus.
Figure 10B:
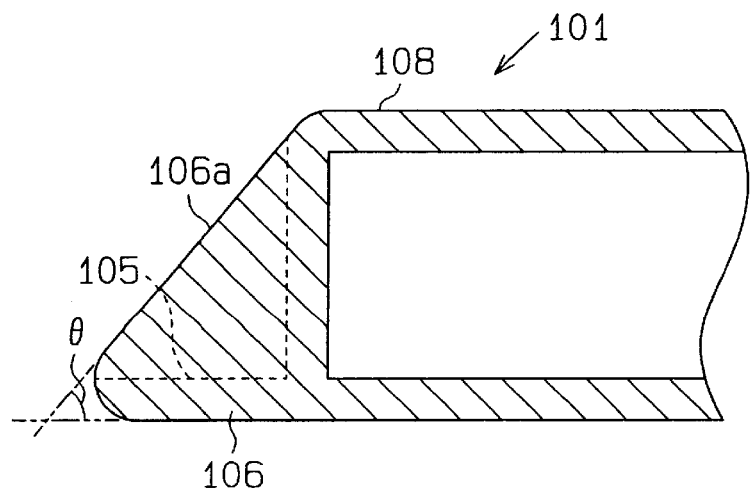
FIG. 10(b) is a partial cross-sectional view taken along line 10b—10b in FIG. 10(a)
Figure 11:
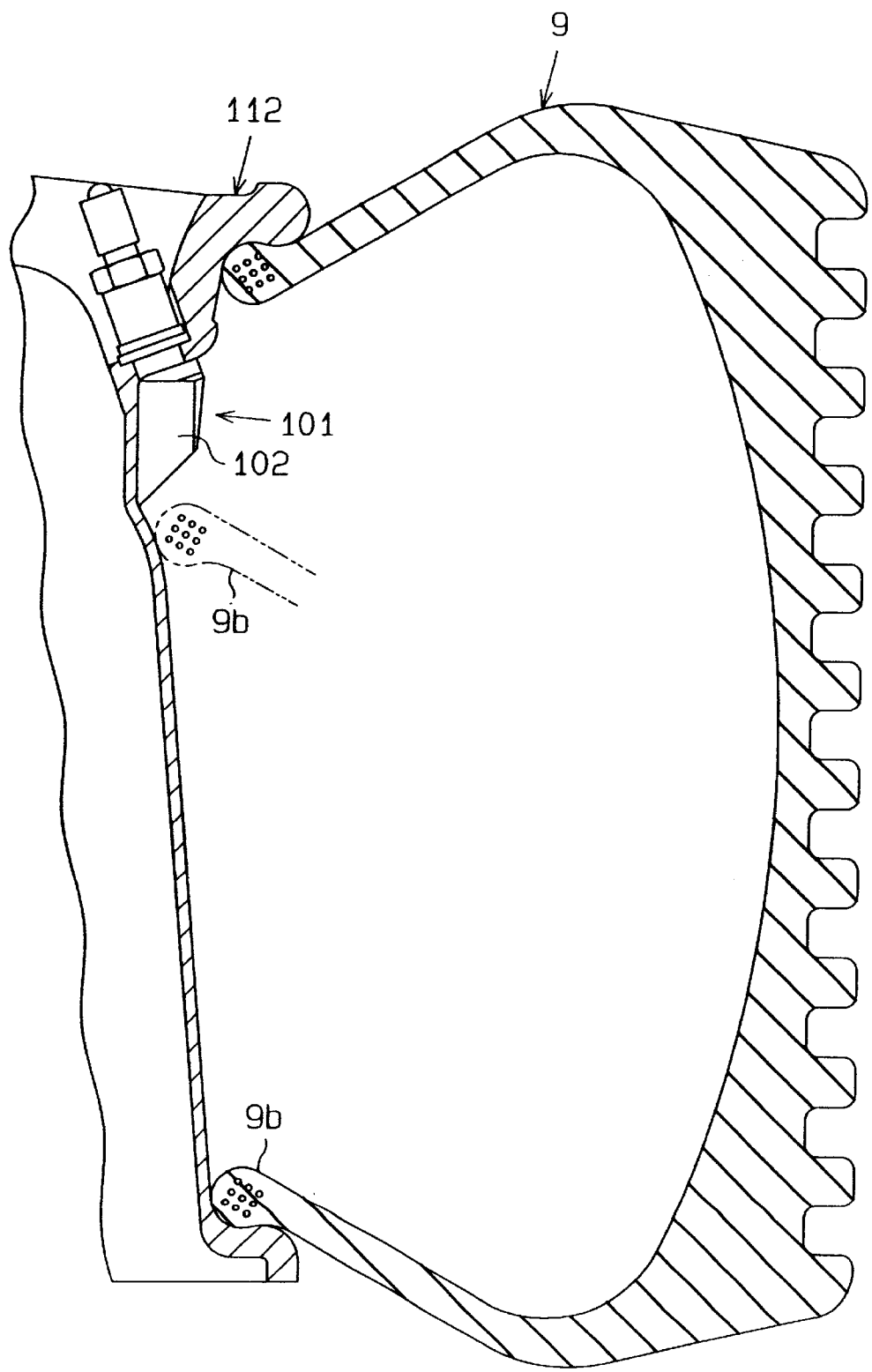
FIG. 11 is a cross-sectional view illustrating the transmitter shown in FIG. 10(a) attached to a wheel.

As shown in FIG. 2, the skirts 10 of the first embodiment are located inward of the casing 2 than the conventional reinforcement ribs 106 shown in FIG. 10(b) by ΔL. In the conventional transmitter 101, a bending moment that forces the reinforcement rib 106 downward is applied to the transmitter 101 by a large amount when the lower bead 9b slides over the reinforcement rib 106. However, in the transmitter 1 according to the first embodiment, a bending moment applied to the transmitter 1 is reduced by an amount corresponding to ΔL. Therefore, the casing 2 endures force applied by the lower bead 9b.

Figure 3:
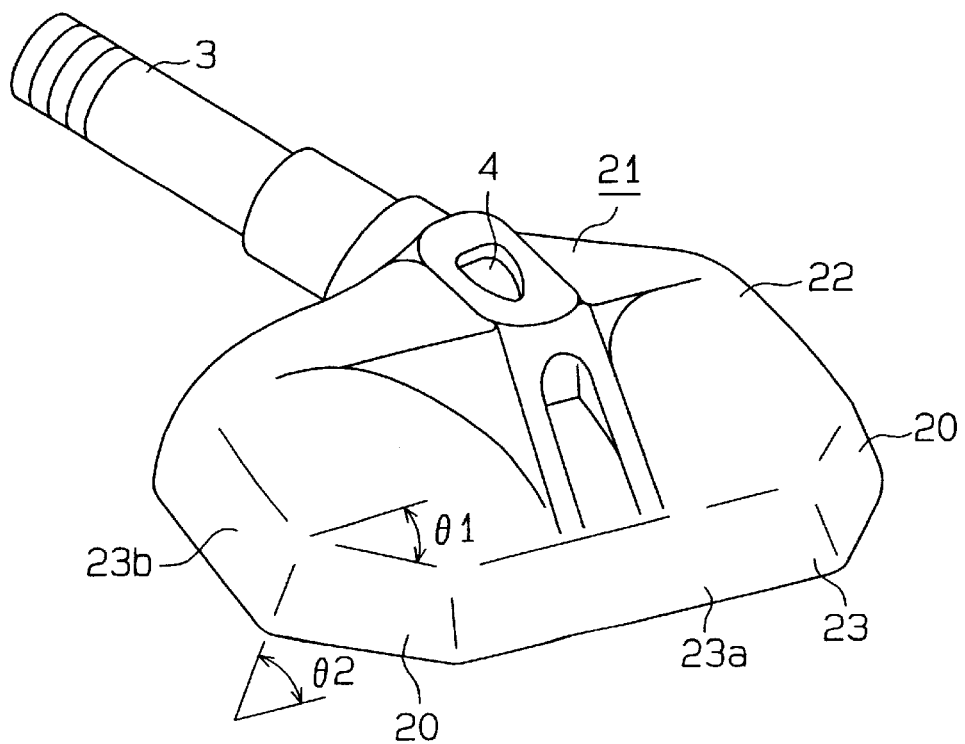
FIG. 3 is a perspective view illustrating a transmitter according to a second embodiment of the present invention.
Figure 8A:
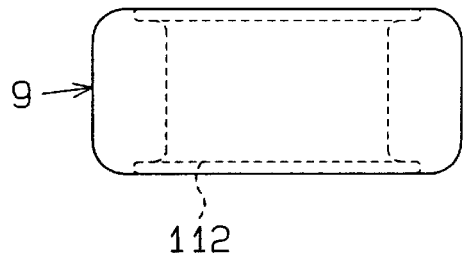
FIGS. 8(a), 8(b), 8(c), and 8(d) are views illustrating the order of tire detaching processes.
Figure 8B:
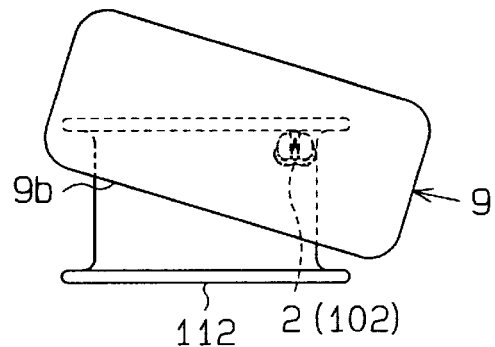
Figure 8C:
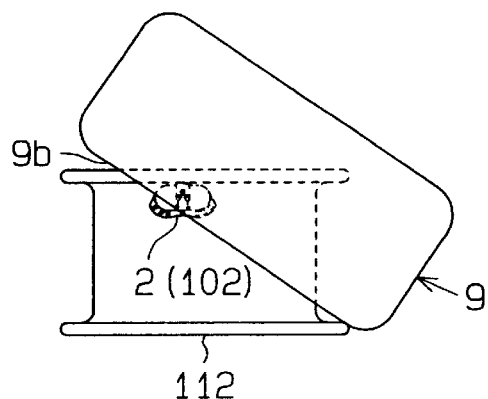
Figure 8D:
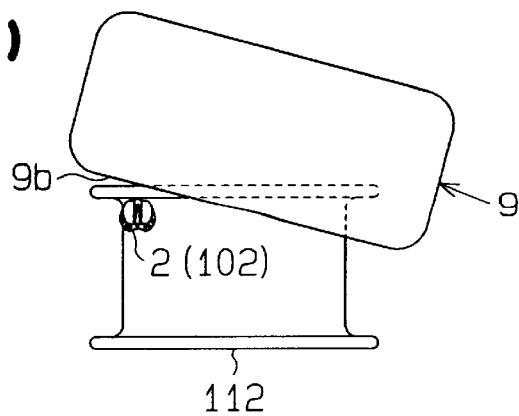
Figure 9:
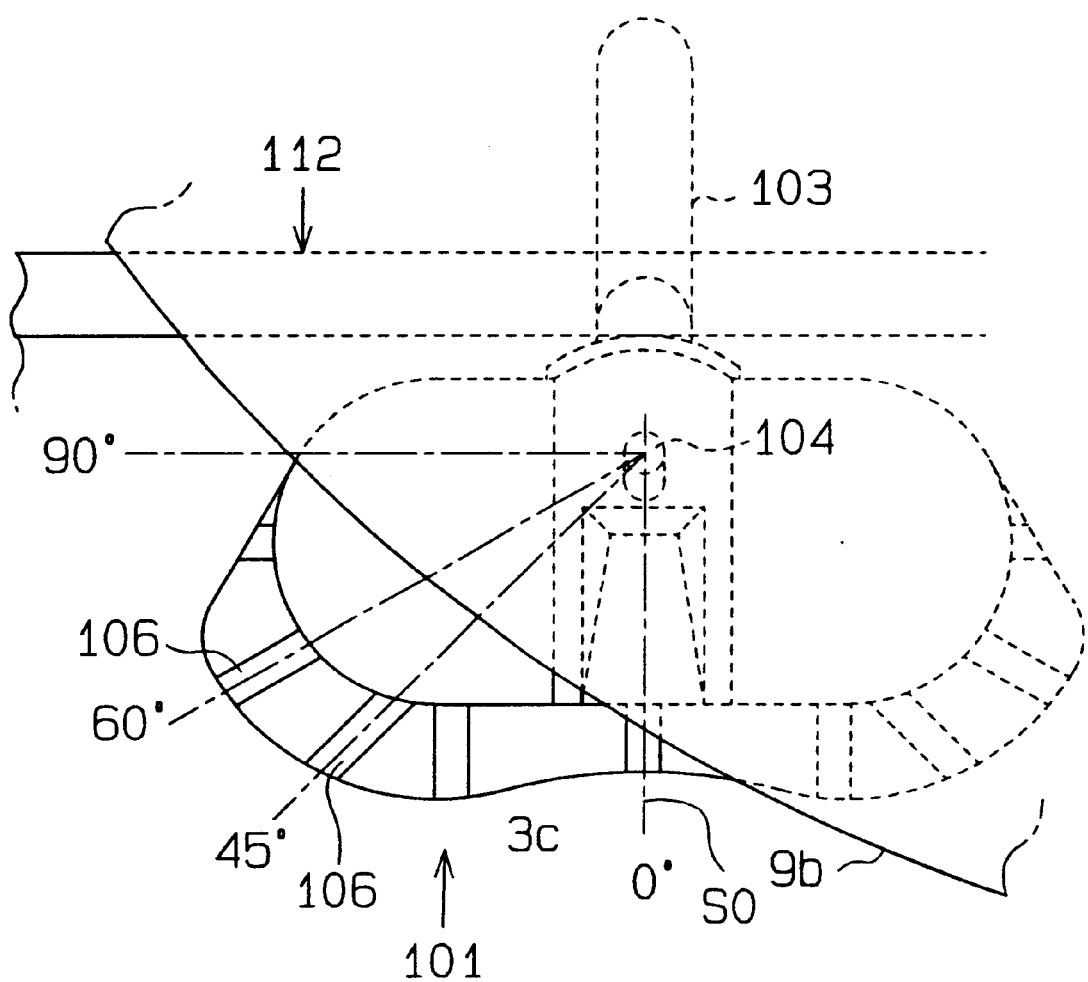
FIG. 9 is an enlarged partial view illustrating the position of the transmitter casing shown in FIG. 8(c) with respect to a lower bead of a tire.

A transmitter 21 according to a second embodiment of the present invention will now be described with reference to FIG. 3. The shape of skirts 20 of the second embodiment differ from that of the skirts 10 of the first embodiment illustrated in FIGS. 1(a) to 2. That is, each skirt 20 of the second embodiment is formed by cutting off the corner between the front surface 23a and the corresponding side surface 23b. In other words, each skirt 20 forms a chamfered portion between the front surface 23a and the corresponding side surface 23b. The surface of each skirt 20 and the front surface 23a are connected by a smooth curve. Likewise, the surface of each skirt 20 and the corresponding side surface 23b are connected by a smooth curve. The skirts 20 and the upper surface of the casing 22 are connected by smooth curves. The angle (corner angle) θ1 defined by the surface of each skirt 20 with respect to a line parallel to the front surface 23a is within the range of 15 to 45 degrees. In other words, the angle between each skirt 20 and the front surface 23a is within the range of 135 to 165 degrees. The inclination angle θ2 between the surface of each skirt 20 and the bottom surface of the transmitter 21 is within the range of 65 to 75 degrees. The corner angle θ1 is set to an angle that is substantially the same as the angle (15 to 45 degrees) between the wheel 112 in the state shown in FIG. 8(c) and the tire 9.

The inclination angle θ of each conventional reinforcement rib 106 shown in FIG. 10(a) is within the range of 45 to 60 degrees. On the other hand, the inclination angle θ2 of each skirt 20 of the second embodiment is within the range of 65 to 75 degrees. Thus, the bending moment applied to the fixed end of the transmitter 21 when the lower bead 9b slides over the skirt 20 is less than that applied to the conventional transmitter 101. Therefore, force that is applied to the transmitter 21 when the lower bead 9b contacts the transmitter 21 while detaching the tire 9 is minimized.

Figure 4:
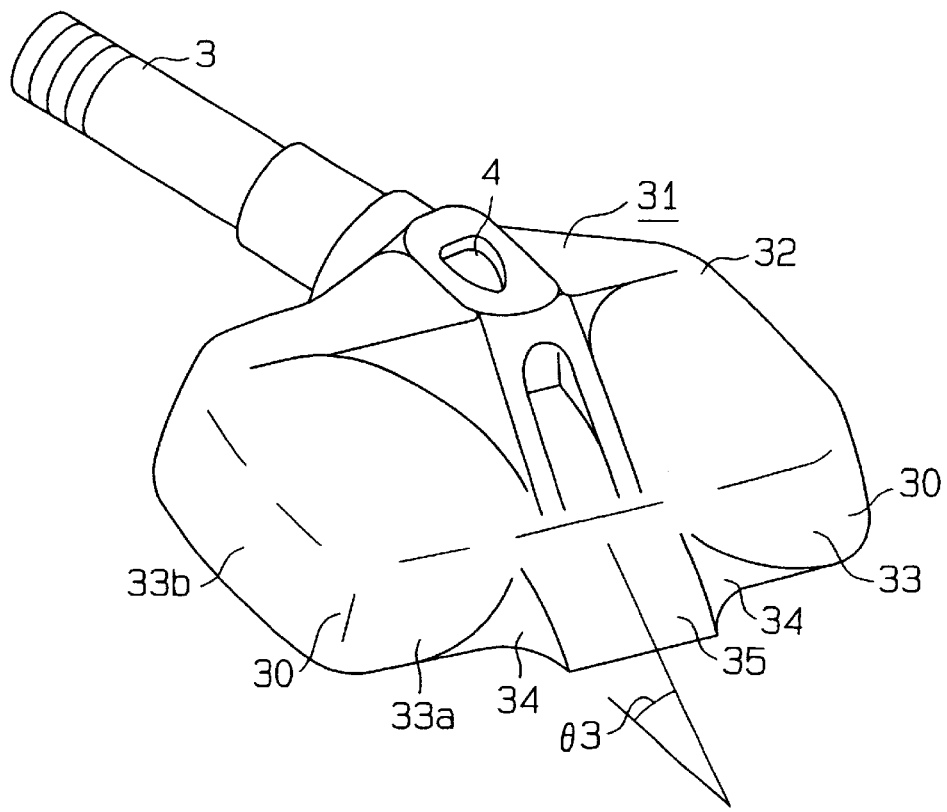
FIG. 4 is a perspective view illustrating a transmitter according to a third embodiment of the present invention.

A transmitter 31 according to a third embodiment of the present invention will now be described with reference to FIG. 4. In the third embodiment, two curved portions 34 and an inclined portion, which is a slide surface 35, are added to the transmitter 21 of the first embodiment shown in FIGS. 1(a) to 2. The slide surface 35 is formed on the front surface 33a between the skirts 30. The inclination angle θ3 defined by the slide surface 35 with respect to the bottom surface of the transmitter 31 is within the range of 65 to 75 degrees. A curved portion 34 is formed on each side of the slide surface 35. The curved portions 34 gradually curve from the bottom surface of the casing 32 toward the upper surface of the casing 32. The curved portions 34 curve from both ends of the slide surface 35 toward the front surface 33a.

Although the lower bead 9b enters a space between the bottom surface of the transmitter 31 and the wheel 112, the lower bead slides over the slide portion 35 when the lower bead 9b contacts the slide portion 35. Therefore, the lower bead 9b that enwraps the transmitter 31 gradually releases the transmitter 31. The entire lower bead 9b that contacts the transmitter 31 eventually moves to the upper surface of the casing. Therefore, force applied to the transmitter 31 by the lower bead 9b is minimized, which prevents breakage of the casing 32.

Figure 5:
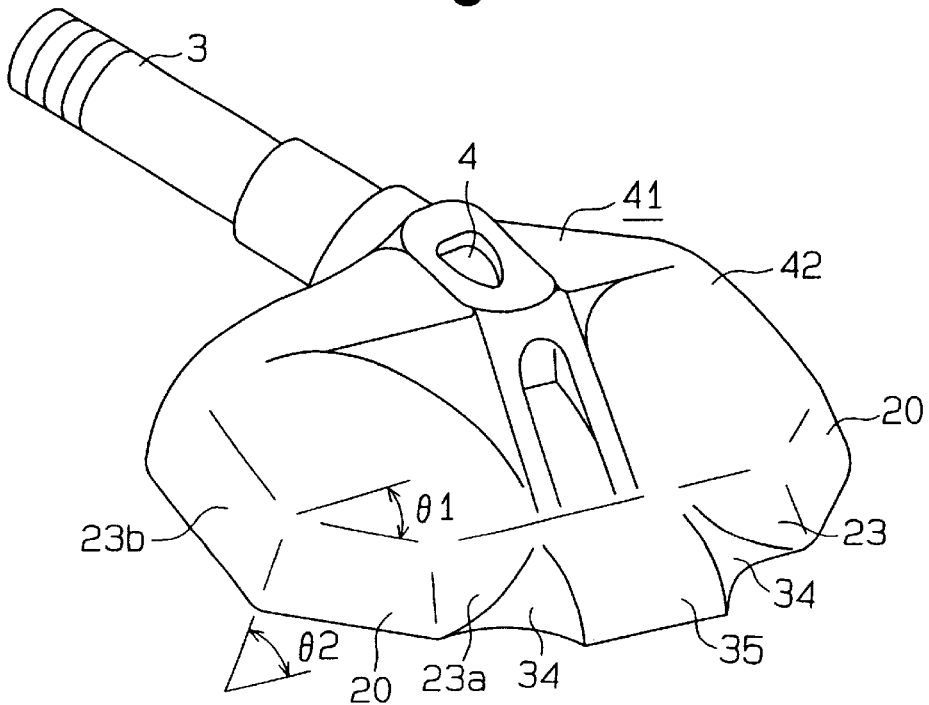
FIG. 5 is a perspective view illustrating a transmitter according to a fourth embodiment of the present invention.

A transmitter 41 according to a fourth embodiment of the present invention will now be described with reference to FIG. 5. The transmitter 41 has the curved portions 34 and the slide surface 35 of the transmitter 31 shown in FIG. 4 in addition to the transmitter 21 of the second embodiment shown in FIG. 3. In the fourth embodiment, force applied to the transmitter 41 when the lower bead 9b contacts the transmitter 41 while detaching the tire 9 is minimized.

Figure 6A:
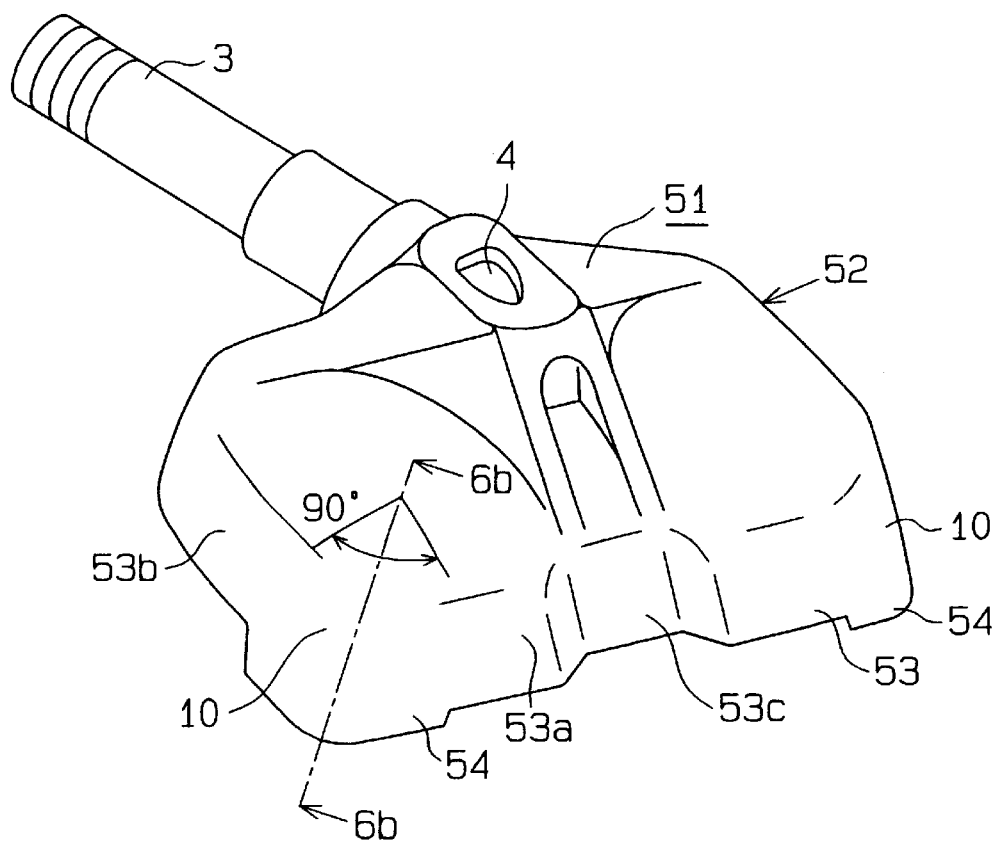
FIG. 6(a) is a perspective view illustrating a transmitter according to a fifth embodiment of the present invention.
Figure 6B:
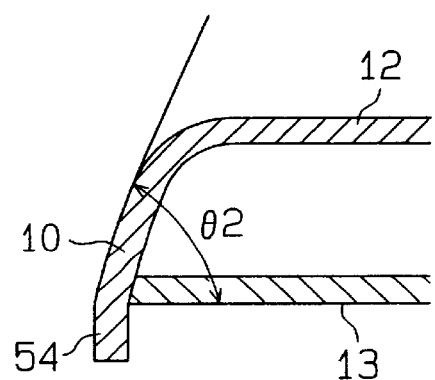
FIG. 6(b) is a cross-sectional view taken along line 6b—6b in FIG. 6(a)
Figure 7:
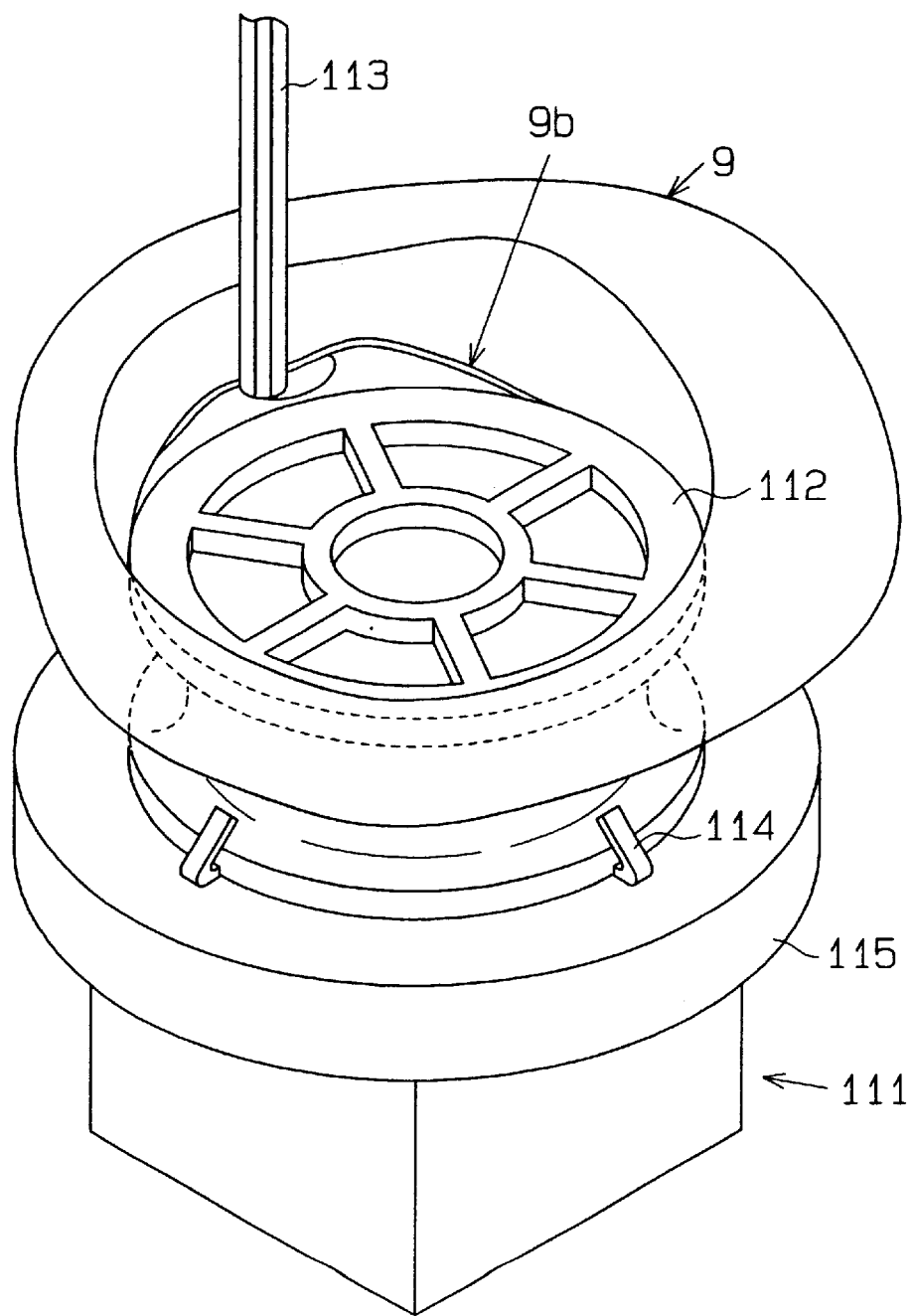
FIG. 7 is a perspective view illustrating a tire detaching apparatus.

A transmitter 51 according to the fifth embodiment of the present invention will now be described with reference to FIGS. 6(a) and 6(b). The transmitter 51 includes two projections 54, which extend further downward than the lower surface of the lower plate 13 of the skirt 10. A recess 53c is formed at the middle portion of a front surface 53a of a surrounding wall 53.

Although a gap is formed between the bottom surface of the transmitter 51 and the wheel 112, the projections 54 extend to the vicinity of the wheel 112. Thus, the lower bead 9b reliably contacts the projections 54 when removing the tire 9. Therefore, the lower bead 9b is prevented from entering the gap. Although the gap is formed, if the projections 54 are in contact with the wheel 112, the transmitter 51 is prevented from rotating about the valve stem 3 when attaching the transmitter 51 on the wheel 112. The projections 54 may be applied to the embodiments illustrated in FIGS. 3 to 5.

It should be apparent to those skilled in the art that the present invention may be embodied in many other specific forms without departing from the spirit or scope of the invention. Particularly, it should be understood that the invention may be embodied in the following forms.

The present invention may be applied to a transmitter that does not include a battery such as a transmitter in which a coil is embedded, and the coil generates electricity between a magnet located outside the tire 9.

The present invention may be applied to a transmitter from which the valve stem 3 can be separated.

Therefore, the present examples and embodiments are to be considered as illustrative and not restrictive and the invention is not to be limited to the details given herein, but may be modified within the scope and equivalence of the appended claims.

What is claimed is:

1. A casing for a transmitter, wherein the transmitter is attached to a wheel such that the transmitter is located inside a tire, and wherein the transmitter transmits information concerning the tire condition, the casing comprising:
   a upper plate;
   a lower plate facing the upper plate;
   a surrounding wall extending between the upper plate and the lower plate, wherein the surrounding wall includes a front surface and a pair of side surfaces, which intersect the front surface; and
   a pair of skirts, each of which is located at one of corners defined between the front surface and the side surfaces, wherein each skirt is curved such that the front surface and the corresponding side surface are smoothly connected, and wherein the skirts are inclined with respect to the lower plate at an angle in the range of 65 to 75 degrees.

2. The casing according to claim 1, wherein each skirt has a substantially spherical crown at a portion where the upper plate, the front surface, and the corresponding side surface intersect.

3. The casing according to claim 1, wherein a slide surface projects forward at the middle portion of the front surface, wherein the slide surface has an inclined surface, which inclines with respect to the lower plate at an angle in the range of 65 to 75 degrees, and wherein each side of the inclined surface is connected to the front surface via a curved portion.

4. The casing according to claim 3, wherein each curved portion curves from the lower plate to the upper plate.

5. The casing according to claim 1, wherein each skirt has a projection, which extends further downward than the lower plate.

6. A casing for a transmitter, wherein the transmitter is attached to a wheel such that the transmitter is located inside a tire, and wherein the transmitter transmits information concerning the tire condition, the casing comprising:
   a upper plate;
   a lower plate facing the upper plate;
   a surrounding wall extending between the upper plate and the lower plate, wherein the surrounding wall includes a front surface and a pair of side surfaces, which intersect the front surface; and
   a pair of skirts, each of which is located at one of corners defined between the front surface and the side surfaces, wherein each skirt forms a chamfered portion between the front surface and the corresponding side surface, and the angle between each skirt and the front surface is in the range of 135 to 165 degrees, and wherein each skirt is inclined with respect to the lower plate at an angle in the range of 65 to 75 degrees.

7. The casing according to claim 6, wherein each skirt is connected to the upper plate, the front surface, and the corresponding side surface via a smooth curved surface.

8. The casing according to claim 6, wherein a slide surface projects forward from the middle portion of the front surface, wherein the slide surface has an inclined surface, which is inclined with respect to the lower plate at an angle in the range of 65 to 75 degrees, and wherein each side of the inclined surface is connected to the front surface via a curved portion.

9. The casing according to claim 8, wherein each curved portion is curved from the lower plate to the upper plate.

10. The casing according to claim 1, wherein each skirt has a projection, which extends further downward than the lower plate.

* * * * *